L. GANTT.
COMBINED COTTON SEED PLANTER AND GUANO DISTRIBUTER.
No. 110,644.   Patented Jan. 3, 1871.
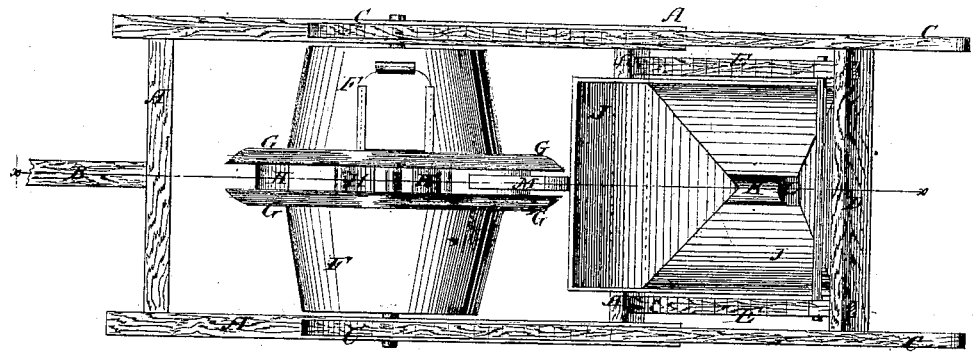
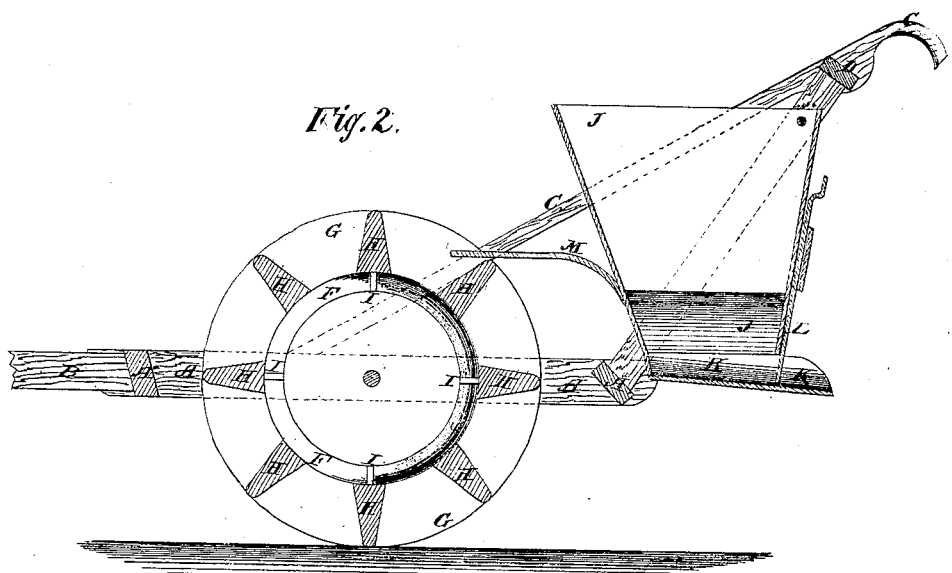

United States Patent Office.

LAFAYETTE GANTT, OF CAMILLA, GEORGIA.

Letters Patent No. 110,644, dated January 3, 1871.

IMPROVEMENT IN COMBINED COTTON-SEED PLANTERS AND GUANO-DISTRIBUTERS.

The Schedule referred to in these Letters Patent and making part of the same.

*To all whom it may concern:*

Be it known that I, LAFAYETTE GANTT, of Camilla, in the county of Mitchell, and State of Georgia, have invented a new and useful Improvement in Combined Cotton-seed Planter and Guano-Distributer; and I do hereby declare that the following is a full, clear, and exact description thereof, which will enable others skilled in the art to make and use the same, reference being had to the accompanying drawing forming part of this specification, in which—

Figure 1 is a top or plan view of my improved machine.

Figure 2 is a vertical longitudinal section of the same, taken through the line x x, fig. 1.

Similar letters of reference indicate corresponding parts.

My invention has for its object to furnish a simple, convenient, and effective machine for planting cotton-seed and distributing guano or other fine fertilizer either separately, or at the same time; and It consists in the construction and combination of the various parts of the machine, as hereinafter more fully described.

A is the frame of the machine, consisting of two side bars, connected at their front and rear ends by cross-bars.

B is the tongue, which is attached to the front cross-bar of the frame A.

C are the handles, the forward ends of which are connected with the side-bars of the frame A.

The rear parts of the handles C are connected with each other by a cross-bar, D, to which is attached the upper end of the upright or uprights E, the lower ends of which are attached to the rear cross-bar of the frame A.

F is the cotton-seed dropper, the body of which is made in the form a cask cut in two parts through its center.

To the adjacent edges of the two parts are attached flanges G, projecting outward, as shown in figs. 1 and 2.

H are blocks, interposed between the flanges G, and secured to them, thus connecting the two parts of the body A securely to each other, and leaving spaces between the said flanges and blocks for the escape of the seed.

The dropper F G H is pivoted to the side bars of the frame by a rod or shaft passing through the center of said dropper.

To the inner surface of the parts F are attached longitudinal ribs or flanges I, which, as the dropper is revolved by the contact of the flanges G with the ground, raise the cotton-seed, and allow it to fall back toward the discharge-openings.

J is the hopper, to receive the guano, and which is hinged at or near its rear upper edge to the upright or uprights E, or to the cross-bar D, by a hinge or by a rod passing through the said hopper, and through the said uprights, as shown in the drawing.

The bottom of the hopper is made semi-cylindrical in form, is inclined downward slightly toward the rear, and projects at the rear, as shown in fig. 2, to serve as a spout, K, for the escape of the guano.

The amount of guano escaping from the hopper J is regulated by a slide, L, sliding in a keeper along the rear side of the said hopper J, and the lower end of which is so formed as to correspond with and fit into the spout K, so that the escape of the guano may be entirely prevented, when desired.

To the forward side of the hopper J is attached an arm, M, which may be made elastic, and which is made of such a length that its forward end may rest upon the outer edges of the blocks H, between the flanges G.

By this arrangement, as the cotton-seed dropper revolves, the arm M drops from one of the blocks H to another, thus jarring the hopper J, and causing the guano to flow out through the spout K.

The hopper J may also be used for planting small seeds in drills, the amount of seed planted being regulated by the slide L.

Having thus described my invention,

I claim as new and desire to secure by Letters Patent—

The combination of the dropper F G H I, and hopper J K L M, with each other, and with the framework A C D E, said parts being constructed and operating substantially as herein shown and described, and for the purpose set forth.

LAFAYETTE GANTT.

Witnesses:
   J. B. BUTLER,
   J. O. TURNER.